April 24, 1945.　　　E. A. KOREVEC　　　2,374,439
INDICATING DEVICE
Filed Feb. 3, 1941　　　2 Sheets-Sheet 1

Inventor:
Edward A. Korevec

April 24, 1945. E. A. KOREVEC 2,374,439
INDICATING DEVICE
Filed Feb. 3, 1941 2 Sheets-Sheet 2
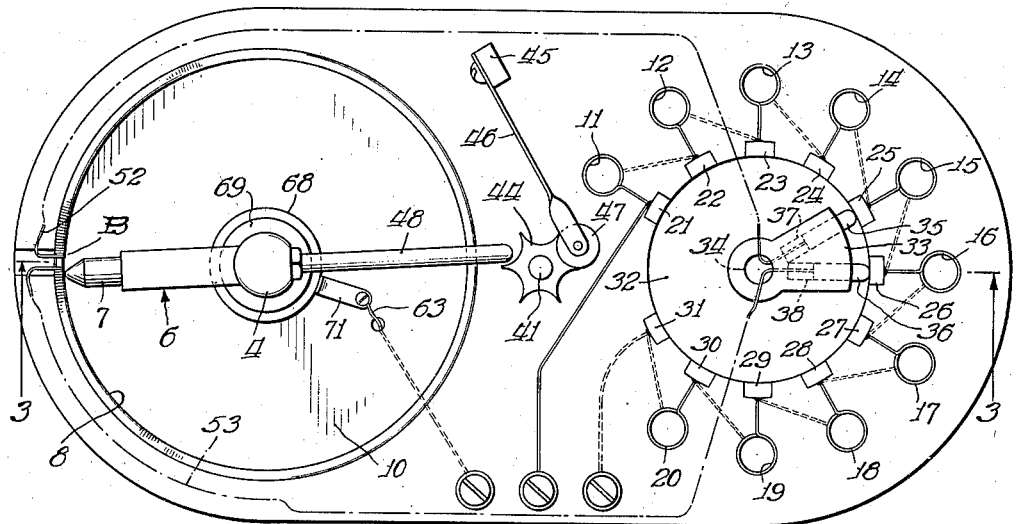
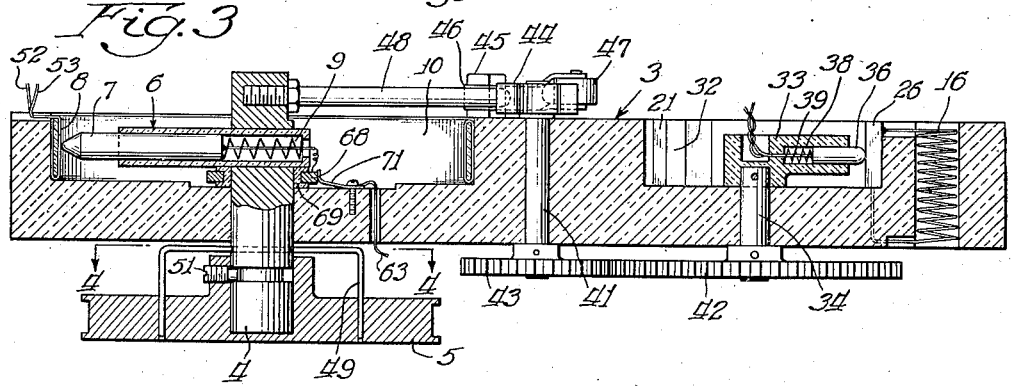
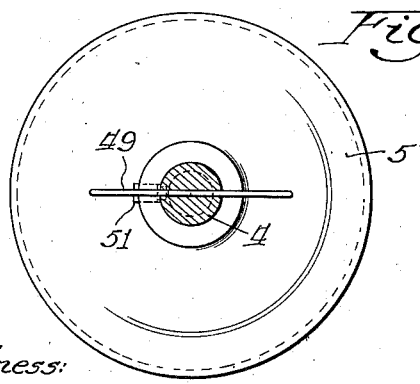
Inventor:
Edward A. Korevec Patented Apr. 24, 1945

2,374,439

UNITED STATES PATENT OFFICE 2,374,439

INDICATING DEVICE

Edward A. Korevec, Joliet, Ill., assignor of one-half to Leo M. Herkert, Joliet, Ill.

Application February 3, 1941, Serial No. 377,203

5 Claims. (Cl. 177—351)

The invention relates generally to indicators or measuring devices, and more particularly to novel means for giving an indication or measurement at a point or points remote from the thing to be indicated or measured.

The invention has among its objects the production of such a device which is relatively simple in construction, inexpensive to manufacture and very efficient for the purposes intended.

Another object of the invention is the production of such a device which may be readily and accurately calibrated.

A further object of the invention is the production of such a device embodying a plurality of fixed resistances in combination with a potentiometer or other potential varying means to provide a device of relatively great sensitivity and accuracy, in which the fixed resistances may be so determined as to provide a substantially uniform calibration over the range of the instrument.

A further object of the invention is the production of such a device in which the potentiometer or the like is automatically connected with the various fixed resistances of the circuit.

Another object of the invention is the production of such a device in which a plurality of transmitting or actuating units may be utilized and balanced with one or more of the receiving or indicating units.

A further object of the invention is the production of such a device embodying novel means for switching the potential varying means into or out of operative relationship with the fixed resistances.

A further object of the invention is the production of such a device in which the switching means is governed and controlled so that the switching action will be fast and positive, thereby insuring correct circuit connections at all times.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 2 is a plan view of the actuating or transmitting unit;

Fig. 3 is a sectional view taken approximately on the line 3—3 of Fig. 2; and

Fig. 4 is a sectional view taken approximately on the line 4—4 of Fig. 3.

Figure 1:
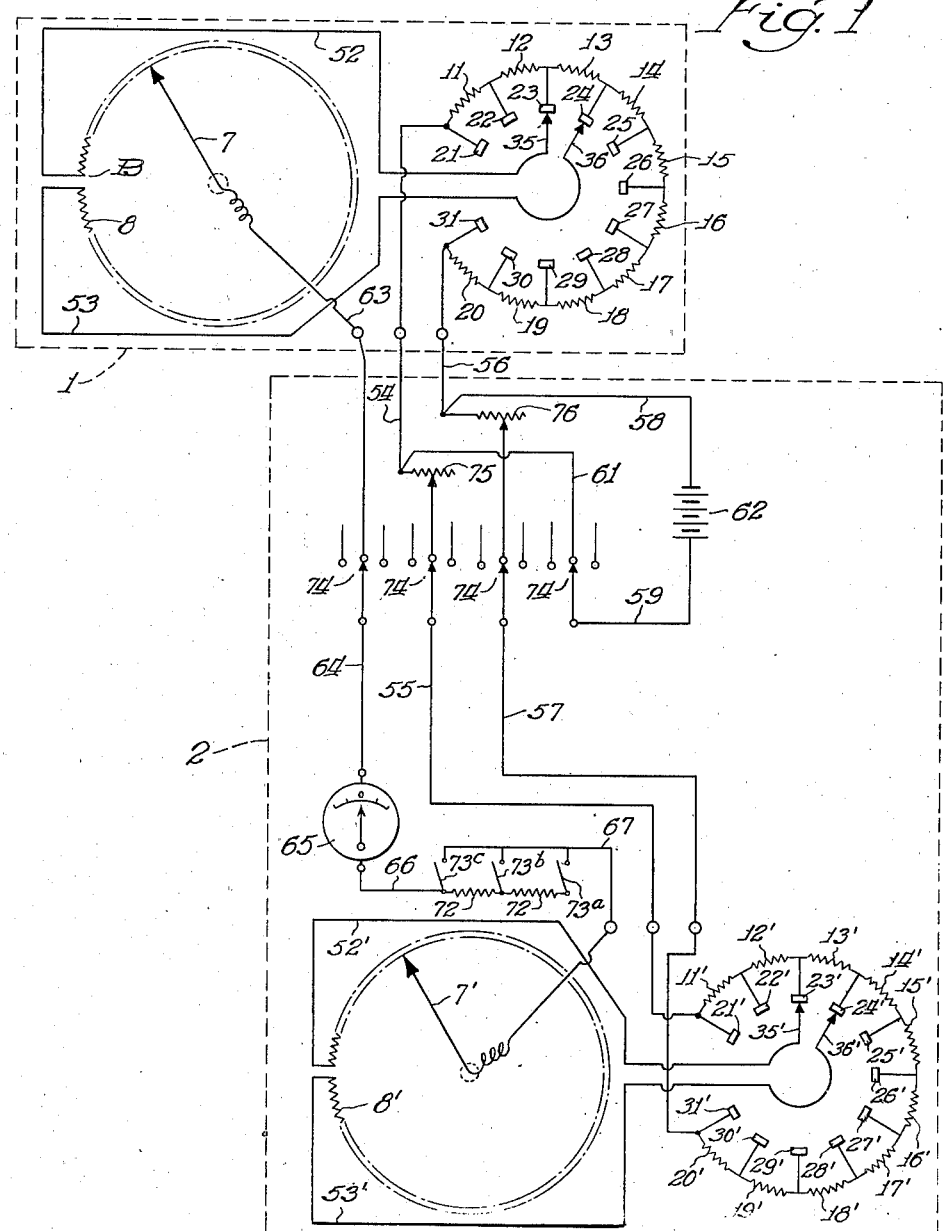
Fig. 1 is a diagrammatic view of a circuit embodying the present invention.

In the past there have been numerous types of devices for giving an indication or measurement at a point remote from that at which the actual change or indication was taking place, as for example, devices for measuring the quantity of fluids in tanks and indicating the same at a point remote from the tanks themselves. Some of these devices have utilized various bridge circuits, wherein the particular measurement to be made is based upon the change in potentials in an electrical resistance circuit, this being accomplished mechanically in response to the variations to be indicated. In the example just given, this could be performed by a float or the like in the particular tank whose fluid is to be measured. In such devices the actuating means varies the potential at one side of the electrical circuit, and to ascertain the amount of change the opposite side of the circuit, which may include a galvanometer or the like, is equalized or balanced therewith at the said remote point where the indications are to be observed, this being accomplished by changing the potential of the last mentioned side of the circuit at that point until the potentials of both sides, as indicated upon the galvanometer or other suitable instrument, are identical. By observing the variations in the potential necessary to balance the circuit, an indication may be obtained as to the changes taking place in the tank, or other device, depending upon the particular thing measured. Generally, only a single variable resistor was employed in conjunction with the actuating means as one of the variables in the bridge circuit. In the present invention the actuating means places a potentiometer or other suitable potential varying means across one or more fixed resistances, this operation, due to the novel mechanical construction employed, being efficiently and positively accomplished by the actuating means.

Referring to the drawings, and more particularly Fig. 1, 1 designates generally the transmitting portion of the device, actuated by any suitable means to vary the potential applied to one side of the circuit, and 2 indicates generally the receiving portion of the circuit, by means of which changes in the transmitting unit may be observed.

As illustrated in Figs. 2 and 3, the transmitting mechanism comprises a base 3 having a shaft 4 journaled therein. Operatively secured to the shaft 4 is a driving wheel 5 which actuates the device. The wheel 5 may be connected with any suitable actuating unit, as for example, such as is shown in my prior Patent Number 2,112,371, issued March 29, 1938, which is there utilized for indicating the quantity of fluid in a tank or other container. However, any other driving means may be employed to rotate the shaft 4 in response to changes in the particular thing to be measured or indicated. Secured to the shaft 4 and rotatable therewith is a hollow contact arm designated generally by the numeral 6 and having a movable contact 7 maintained in engagement with the circular resistance band 8, by means of a spring 9, the resistance 8 being illustrated in the present instance as positioned in a recess 10 in the base member 3, the latter being illustrated as constructed of an insulating material. As the shaft 4 is rotated the movable contact 7 of the arm 6 will engage the resistance element 8 at various points thereof, thus forming a potentiometer. Carried by the base member 3 are a plurality of fixed resistance units 11 to 20 inclusive, these resistors being connected at their respective ends to contacts 21 to 31 inclusive and putting all the resistors in series with one another.

As shown in Fig. 3, the contacts 21 to 31 are radially positioned around the side walls of a bore or recess 32. Positioned in the recess 32 is a movable contact arm 33 secured to a rotatable shaft 34 journaled in the base 3, the arm 33 being constructed of an insulating material and provided with a pair of contacts 35 and 36 positioned in bores 37 and 38 in the arm. Compression springs 39 urge the respective contacts 35 and 36 into engagement with the side wall of the recess 32 and the contacts 21 to 31. As illustrated in Figs. 1 and 2 the movable contacts 35 and 36 are so spaced that they will simultaneously engage a pair of stationary contacts.

The shaft 34 is operatively connected to a shaft 41, also journaled in the base member 3, by means of gears 42 and 43 carried by the respective shafts. Secured to the opposite end of the shaft 41 is a trip pinion 44 which, in the present embodiment of the invention, is of substantially a star shape.

Attached at one end to a stud 45 carried by the base 3, is a spring member 46 having a roller 47 pivotally carried by the free end of the spring member, the roller 47 being engageable with the trip pinion 44 to maintain the latter in various positions. The relationship of the gears 42 and 43 and the pinion 44 is such that a one-sixth revolution of the pinion 44 will rotate the arm 33 through a sufficient arc to bring the contacts 35 and 36 in engagement with the succeeding stationary contacts 21 to 31. The pinion 44 is actuated by an arm 48 rigidly carried by the shaft 4. Thus, every time the shaft 4 makes one complete revolution it will advance the pinion 44 through one-sixth revolution and thereby rotate the arm 33 to bring the movable contacts 35 and 36 into engagement with the succeeding fixed contacts.

It will be apparent that this construction provides a governing action of the relative movement of the trip pinion 44 and roller 47 so that the arm 33 will at all times be maintained in proper relation to the stationary contacts.

It is also desirable that the arm 33 be moved to a succeeding position at the same time the contact 7 leaves one end of the resistance and engages the other end thereof and that there be no possibility of the contact 7 stopping between the ends of the resistance 8 or the contacts 35 and 36 stopping between the fixed contacts.

To insure this result novel means are employed for connecting the driving wheel 5 to the shaft 4. Referring to Figs. 3 and 4 it will be seen that the wheel 5 is not rigidly connected to the shaft 4, but is free to rotate relative thereto. A driving connection is obtained by securing a spring member 49 to the shaft 4, the spring in the present instance passing through the shaft, and connecting the ends of the spring to the driving wheel 5 or other driving member. If desired a screw 51 or other means may be employed to prevent longitudinal movement between the wheel and shaft.

In operation, when the arm 48 engages the trip pinion 44, the arm will stop, the wheel 5 continuing to rotate and will rotate relative the shaft 4 until the force built up in the spring 49 is sufficient to overcome inertia including the force applied by the spring 46 and roller 47 to the pinion 44. Due to the energy stored in the spring 49, the pinion 44 will remain in its initial position until sufficient force is built up, to actuate the contacts 7, 35, and 36 in a single fast snap action and eliminating any possibility of the contact assuming an inoperative position. Thus it will be apparent that a definite controlling or governing action of the movable contacts is a result of the novel construction employed.

The receiving mechanism is similar in construction to the transmitting mechanism just described with the exception that the wheel 5 is replaced with a suitable dial knob or the equivalent, by means of which the mechanism may be manually actuated, or if desired, may be connected with a suitable recording device. A pointer or the like may also be employed to indicate the position of the contacts 35' and 36'. For clarity, in Fig. 1 of the drawings, the various parts of the receiving mechanism are designated by the same reference numerals as the corresponding parts of the transmitting mechanism with the addition of (').

The circuit arrangement is as follows:

The respective ends of the resistance 8 are connected by conductors 52 and 53 to the movable contacts 35 and 36 on the arm 33, so that the resistance 8 will be placed in parallel with any one of the resistances 11 to 20, depending upon the particular contacts 21 to 31 engaged by the movable contacts 35 and 36, as for example, when the contacts 35 and 36 are in the position illustrated in Fig. 1, the resistance 8 will be connected in parallel with the resistance 13. In a similar manner the resistance 8' and contacts 35' and 36' are connected by conductors 52' and 53'.

The contact 21 is connected through conductors 54 and 55 to a corresponding contact 21' of the receiver resistance bank consisting of the resistances 11' to 20', inclusive, and contacts 21' to 31'. Similarly, the contact 31 is connected by conductors 56 and 57 to the contact 31'. Thus it will be seen that the resistance bank of the transmitter and the resistance bank of the receiver are connected in parallel. Also connected in parallel with the two resistance banks by means of conductors 58, 59, and 61, is a battery 62 or other source of potential. The movable contact 7 of the transmitter engageable with the resistance 8 is connected by conductors 63 and 64 to a galvanometer or other suitable instrument 65, the opposite side of the latter being connected by conductors 66 and 67 to the corresponding movable contact 7' of the receiver. In the embodiment of the invention illustrated in Figs. 2 and 3, electrical connection to each of the movable contacts 7 and 7' is obtained by the use of a conductor ring 68 electrically connected to the contact and carried by the shaft 4, the ring being insulated therefrom by the insulating ring 69. A fixed contact 71 engageable with the ring 68 completes the circuit. As a protection to the instrument 65, resistances 72 and switches 73a, 73b, and 73c are inserted in series between the instrument 65 and the movable contact 7'.

The operation of the device is as follows:

Assuming the device to be connected to a suitable actuating mechanism for measuring the quantity of liquid in a tank or other container, the contacts 35 and 36 of the transmitter will initially be engaged with the stationary contacts 21 and 22, assuming the tank is empty, with the contact 7 at its initial or beginning position at the end B of the resistance 8. As the tank becomes filled, the actuating mechanism will rotate the arm 6 and contact 7 in a clockwise direction. To ascertain the position of the contact 7 at any time during its first revolution, the switch 73a is closed to place the galvanometer or other instrument 65 in series with the arms 7 and 7', and the control knob of the receiver is rotated until a minimum indication is obtained on the galvanometer, which would occur when the movable contacts 35' and 36' are engaged with the stationary contacts 21' and 22' and the contact 7' is in the same position with respect to its resistance 8' as the contact 7 is with respect to its resistance 8. When this balanced condition is reached, the respective elements of the transmitting unit 1 and receiving unit 2 are identically positioned with respect to one another, and by noting the position of the contacts 35', 36', and the contact 7' as indicated by their pointers or dials, the amount of liquid in the tank may be determined, the dials, if desired, being directly calibrated in the particular unit of measurement employed. After the arm 6 of the transmitter has completed one revolution, the arm 48 carried by the shaft 4 will trip the pinion 44 which, by means of the gears 42 and 43, will rotate the shaft 34 to bring the movable contacts 35 and 36 in engagement with the contacts 22 and 23, respectively, thus putting the resistance 8 in parallel with the resistance 12. In a similar manner each successive revolution of the shaft 4 and arm 48 will place the resistance 8 in parallel with the succeeding fixed resistances of the series, and by rotating the control knob or knobs of the receiver to a position wherein no current flows through the galvanometer, the transmitter and receiver may be balanced with one another and thereby indicate the desired results.

As previously mentioned, the resistances 72 and switches 73a, 73b, and 73c are inserted in series with the galvanometer to protect the instrument, if the contacts 7 and 7' were at opposite ends of their respective resistances, and then the knob has been rotated to approximately balance the receiver with the transmitter, the switches 73b and then the switch 73c may be closed to provide greater sensitivity and a more accurate adjustment of the contact 7'.

As previously mentioned with the present construction, employed to rotate the movable contacts 35 and 36, a snap action is achieved so that the actual switching will take place at substantially the moment the contact 7 leaves one end of the resistance 8 and contacts the opposite end of the resistance. Likewise, the roller 47 maintains the pinion 44 and associated parts in a fixed position while the arm 6 makes a complete revolution, thereby eliminating any possibility of the contacts 35 and 36 moving out of their proper position with respect to the stationary contacts.

As illustrated in Fig. 1, the conductors 64, 55, 57 and 59 of the receiving unit may be connected to suitable switches 74, whereby the receiver may be operatively connected to a plurality of transmitting units. To assure proper calibration of the receiving unit with each of various transmitting units, variable resistors 75 and 76 may be placed in series with the conductors 54—55 and 56—57 of the respective units, so that the transmission lines may be equalized with respect to one another, thus compensating for various lengths of conductors, etc., which would vary the resistance relationship of the battery or other potential source, and the respective transmitters and receivers to one another. Such a situation would arise where the several transmitters and receivers were positioned at various distances. It will be apparent that it is desirable, in order that accurate results be obtained, to have the battery centered with respect to both sides of the circuit.

It will be apparent that by use of a plurality of fixed resistances 11 to 20, inclusive, the calibration of the device may be varied to suit the particular requirements, this being accomplished by properly selecting the resistances of the various fixed resistors, and by the same means the device may be constructed of more or less uniform sensitivity throughout its range. If the resistors 8 and 8' are held to a very close tolerance so that they are of the same resistance, the tolerances of the remaining fixed resistors may be greater without appreciably affecting the accuracy of the device. It will be apparent that while the movable contacts 35—36 and 35'—36' are illustrated as engaging adjacent fixed contacts, if desired the movable contacts could be spaced farther apart to engage every second or third stationary contact etc., without affecting the principle involved.

Likewise, if desired, the arm 48 could be omitted in the receiver and the arm 33 controlled by its own dial or knob, independently of the contact 7'.

Similarly, the main shaft of the receiver, corresponding to the shaft 4 of the transmitter could be connected to a suitable recording device that would be actuated by the indicating circuit to control the receiver and maintain it in a balanced condition, and at the same time record the changes necessary to accomplish this.

It will be apparent from the above description that I have provided a device for indicating measurements and the like at remote points, which construction is relatively simple and very efficient for the purposes intended. It will also be noted that I have produced an indicating device which may be readily and accurately calibrated and which may be constructed to provide an instrument having improved characteristics as to sensitivity, etc.

As previously mentioned, the device may be employed for use on most any type of equipment wherein a remote indicating instrument is required.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In an indicating device of the kind described, the combination of a source of electrical energy, a pair of resistances connected in parallel with said source, a pair of potentiometers connected in parallel with any one of a number of individual and successively arranged adjacent sections of the respective resistances, each potentiometer comprising a resistance having a contact movably related thereto, and an indicating instrument operatively connected to the movable contacts on said potentiometers.

2. In a device of the kind described, the combination of a source of electrical energy, a pair of fixed resistances connected in parallel with said source, a pair of potentiometers, each of the latter being operatively connected with one of the respective resistances, each potentiometer comprising a resistor and a contact movably related thereto, said resistors adapted to be placed in parallel with various portions of their respective resistances, an indicating instrument connected to said movable contacts to indicate the difference in potential therebetween, and actuating means for moving the movable contact of one of said potentiometers.

3. In an indicating system which includes a transmitter and a receiver each having a fixed resistance and a potentiometer comprising a resistance and a contact movably related thereto, a source of electrical energy, line conductors for connecting the fixed resistance of said transmitter across said source, conductor means including a variably adjustable resistor for connecting the fixed resistance of said receiver across said source in parallel with the fixed resistance of said transmitter, means in said transmitter for connecting said potentiometer resistance in parallel with individual and successively arranged adjacent sections of the fixed resistance thereof, means in said receiver for connecting the potentiometer resistance in parallel with individual and successively arranged adjacent sections of the fixed resistance thereof, and means including an indicating instrument for operatively connecting the movable contact of the potentiometer in said transmitter with the movable contact of the potentiometer in said receiver.

4. In an indicating system which includes a transmitter and a receiver each having a fixed resistance and a potentiometer comprising a resistance and a contact movably related thereto, a source of electrical energy, line conductors for connecting the fixed resistance of said transmitter across said source, conductor means including a variably adjustable resistor for connecting the fixed resistance of said receiver across said source in parallel with the fixed resistance of said transmitter, whereby the resistance of said conductor means may be adjusted in accordance with the resistance of said line conductors, means in said transmitter for connecting said potentiometer resistance in parallel with individual and successively arranged adjacent sections of the fixed resistance thereof, means in said receiver for connecting the potentiometer resistance in parallel with individual and successively arranged adjacent sections of the fixed resistance thereof, and means including an indicating instrument for operatively connecting the movable contact of the potentiometer in said transmitter with the movable contact of the potentiometer in said receiver.

5. In an indicating system which includes a transmitter and a receiver each having a fixed resistance and a potentiometer comprising a resistance and a contact movably related thereto, a source of electrical energy, line conductors for connecting the fixed resistance of said transmitter across said source, conductor means including a variably adjustable resistor for connecting the fixed resistance of said receiver across said source in parallel with the fixed resistance of said transmitter, whereby the resistance of said conductor means may be adjusted in accordance with the resistance of said line conductors, means in said transmitter for connecting said potentiometer resistance in parallel with individual and successively arranged adjacent sections of the fixed resistance thereof, means in said receiver for connecting the potentiometer resistance in parallel with individual and successively arranged adjacent sections of the fixed resistance thereof, means including an indicating instrument and a plurality of resistances for operatively connecting the movable contact of the potentiometer in said transmitter with the movable contact of the potentiometer in said receiver, and switching means for selectively inserting said resistances in series with said instrument.

EDWARD A. KOREVEC.